United States Patent
Catoul et al.

(10) Patent No.: US 7,157,860 B2
(45) Date of Patent: Jan. 2, 2007

(54) CONTROL DEVICE FOR FLASHLIGHT SYSTEMS IN AIRPORTS

(75) Inventors: Pierre Catoul, Bonheiden (BE); Francis Caus, Schaarbeek (BE); Daniel Tessens, Herent (BE); Jean-Claude Vandevoorde, Steenkokkerzeel (BE)

(73) Assignee: Siemens Aktiengesellschaft, Munich (DE)

( * ) Notice: Subject to any disclaimer, the term of this patent is extended or adjusted under 35 U.S.C. 154(b) by 42 days.

(21) Appl. No.: 10/491,732

(22) PCT Filed: Oct. 7, 2002

(86) PCT No.: PCT/DE02/03785

§ 371 (c)(1),
(2), (4) Date: Sep. 17, 2004

(87) PCT Pub. No.: WO03/031262

PCT Pub. Date: Apr. 17, 2003

(65) Prior Publication Data

US 2005/0017659 A1    Jan. 27, 2005

(30) Foreign Application Priority Data

Oct. 5, 2001   (DE) ................................ 101 49 261

(51) Int. Cl.
*H05B 37/00* (2006.01)
*H05B 41/16* (2006.01)

(52) U.S. Cl. .................. 315/200 A; 315/247; 315/312; 307/12

(58) Field of Classification Search ............ 315/200 A, 315/247, 255, 277, 291, 307, 308, 312, 324; 307/12, 17, 36, 37, 109, 147; 361/600, 601, 361/91.1
See application file for complete search history.

(56) References Cited

U.S. PATENT DOCUMENTS

| | | | | |
|---|---|---|---|---|
| 2,734,180 A | * | 2/1956 | Pennow | 340/953 |
| 2,817,069 A | * | 12/1957 | Pennow | 340/953 |
| 3,488,558 A | * | 1/1970 | Grafton | 315/312 |
| 3,531,765 A | * | 9/1970 | Christianson et. al. | 340/953 |
| 3,648,105 A | * | 3/1972 | Sanford | 315/237 |
| 3,710,157 A | * | 1/1973 | Wright | 307/131 |
| 3,925,704 A | * | 12/1975 | Camic | 315/200 A |
| 4,093,937 A | * | 6/1978 | Habinger | 340/949 |
| 4,593,345 A | | 6/1986 | Beggs | 362/267 |
| 5,291,299 A | * | 3/1994 | Karna | 315/323 |
| 5,426,429 A | | 6/1995 | Norman et al. | 340/953 |

(Continued)

FOREIGN PATENT DOCUMENTS

DE          42 32 618 A1     3/1994

(Continued)

Primary Examiner—Thuy Vinh Tran
(74) Attorney, Agent, or Firm—Harness, Dickey & Pierce, P.L.C.

(57) ABSTRACT

A control for a flashlight system in an airport, includes flash units which are connected to an energy supply line and, on the output side, to respective flashlights of the flashlight system via a light cable. In order to avoid unwanted high voltages, each flash light unit includes an energy-integrating low-voltage capacitor which can be supplied by a current source having a corrected power factor and which is connected to the flashlights embodied as low-voltage lights. The energy transmitted to the flashlights can be electronically controlled. A connection device connecting the flash units to a local master control system is embodied as a local field bus system, in such a way that different, conventionally arranged, simultaneous or mixed flash configuration patterns can be produced by way of the same electrical installation.

27 Claims, 1 Drawing Sheet

U.S. PATENT DOCUMENTS 6,489,733 B1    12/2002    Schmidt et al. ............. 315/312

FOREIGN PATENT DOCUMENTS

| | | |
|---|---|---|
| DE | 298 23 494 U1 | 9/1999 |
| DE | 299 15 610 U1 | 3/2000 |
| DE | 100 07 895 | 8/2001 |
| DE | 100 07 896 | 8/2001 |
| DE | 100 26 923 | 2/2002 |
| JP | 02239595 | 9/1990 |
| JP | 15-155 394 A | 6/1993 |
| WO | WO 99/14989 | 3/1999 |

* cited by examiner

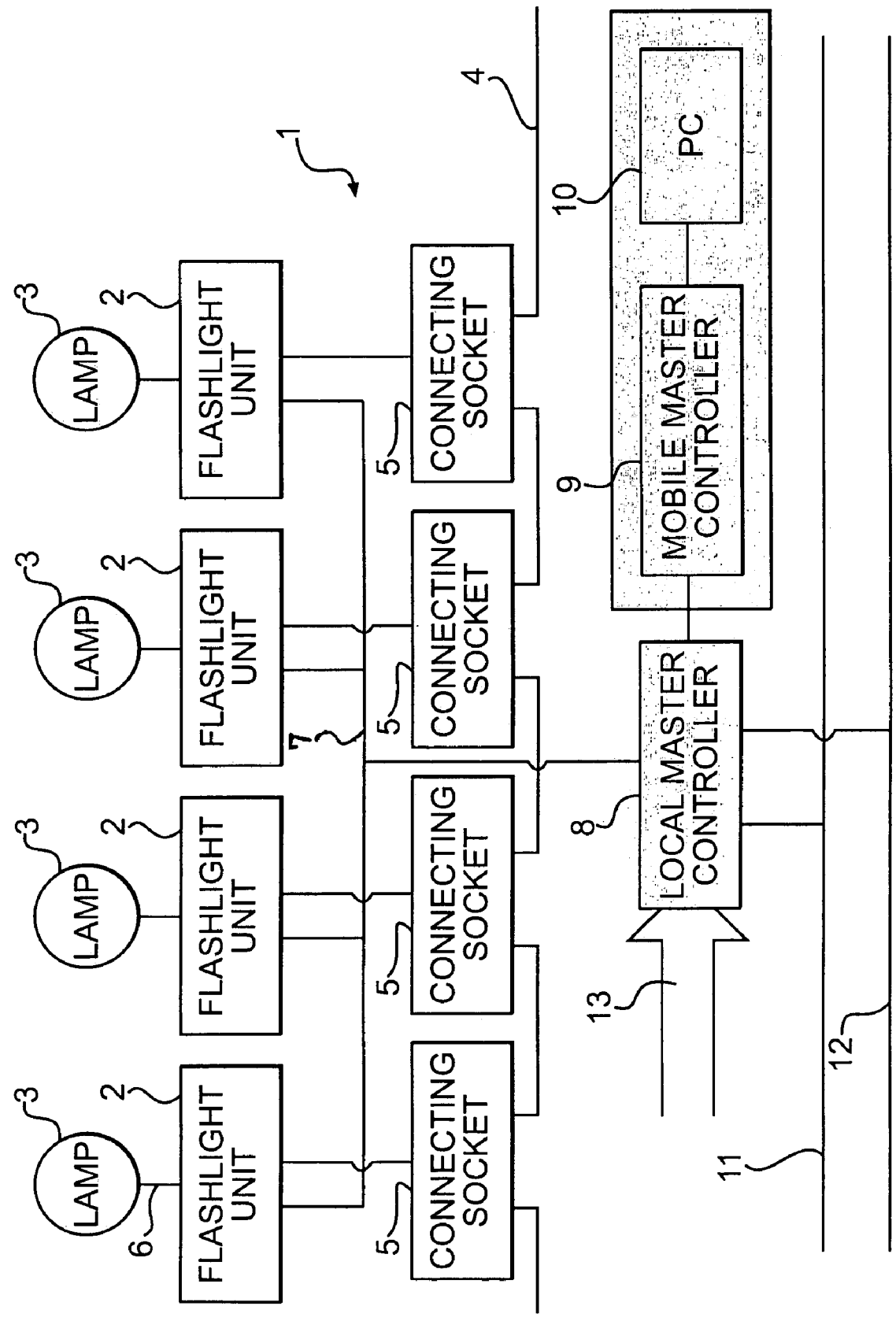

CONTROL DEVICE FOR FLASHLIGHT SYSTEMS IN AIRPORTS

This application is the national phase under 35 U.S.C. § 371 of PCT International Application No. PCT/DE02/03785 which has an International filing date of Oct. 7, 2002, which designated the United States of America and which claims priority on German Patent Application number DE 101 49 261.8 filed Oct. 5, 2001, the entire contents of which is hereby incorporated herein by reference.

FIELD OF THE INVENTION

The invention generally relates to a control device for flashlight systems at airports. Preferably, it relates to one including flashlight units, which are connected on the input side to a power supply line and on the output side to in each case one flash lamp of the flashlight system by way of a lamp cable. They preferably further include, in each case, one PCB (Printed Circuit Board) for controlling the flash lamp, a local master controller, and a connecting device, by which the local master controller is connected to the flashlight units.

BACKGROUND OF THE INVENTION

The flashlight units of known control devices for flashlight systems at airports are usually equipped with high-voltage capacitors which provide output voltages of around 2000 V for operating the flash lamps. Owing to these high voltages required for operating the flashlight systems, cables and system components arranged outdoors are subjected to considerable loads, which relatively often leads to system failures, in particular in damp weather. The high voltages required for operation also bring with them considerable risks to safety. As long as the flash lamp is connected to the flashlight unit via a cable connection which is longer than 6 m, instabilities result with respect to the light output power. Furthermore, known control devices of this type offer few or no possibilities for monitoring the operation of individual flash lamps.

Furthermore, it is known from the prior art to connect low-voltage flash lamps directly to main power terminals. If appropriate, this is done with a low current-limiting impedance connected in between. This results in high current pulses through the power source and large cable cross sections being required. The current pulses bring about considerable disturbances in the main power source, which has a disadvantageous effect on other loads connected to the same main power source.

SUMMARY OF THE INVENTION

An object of an embodiment of the invention is to provide a control device for flashlight systems at airports, in which the risks to safety when operating the flashlight system are considerably reduced, and/or which can be implemented, furthermore, with low production and installation complexity.

An object can be achieved, according to an embodiment of the invention, by each flashlight unit having a power-integrating low-voltage capacitor which can be supplied with power by a power factor-corrected power source which is connected to the flash lamps in the form of low-voltage lamps. This can be done by it being possible to electronically control the power transferred to the flash lamps in order to regulate the luminous intensity and to stabilize it with respect to voltage-source and line-impedance fluctuations; and by the connecting device which connects the flashlight units to the local master controller being in the form of a local field bus system, such that, via the same electrical installation, different, conventionally arranged, simultaneous or mixed flashlight configuration patterns can be realized.

Owing to the extended discharge time and the reduction in the level of the operating voltage made available on the output side of the flashlight units in conjunction with the possible use according to an embodiment of the invention of low-volt lines between the flashlight units and the flash lamps, it is possible to prevent electromagnetic distortions which are produced by the power circuits of the flashlight units and the power supply cables or lamp cables. Current peaks can be prevented or at least considerably reduced by the use of the low-voltage capacitors as power integrators.

The cross section for the power supply cable or lamp cable may be considerably smaller than in the prior art. If the cross section of the power supply cable or lamp cable is not reduced, it is possible for there to be greater distances between the flashlight unit and the flash lamp in the form of a low-voltage lamp with low losses. The low losses in the lamp cables can be attributed to the fact that the current peaks are only approximately half as high as in the case of typical high-voltage flash lamps.

The low-voltage lamps comply with the relevant standards for flash lamps at airports IEC-61824 and 61000 (electromagnetic compatibility). The power can be supplied, in the case of the control device according to the invention, over a wide range, the flashlight unit operating correctly even at a power supply of approximately 65% of the rated level. The actual switching element can be arranged close to the low-voltage lamp or the flash lamp, as a result of which power savings can be made, larger cable lengths are possible and fewer distortions result.

A 5-wire cable which can be buried in the ground can be used as the lamp cable, with two axes for the lamp power supply, two wires for connection to the safety switch and one end cable. Between two flashes, the low-voltage capacitor is charged with a very low power, which cannot trigger the flash lamp, to the rated switching voltage level. When the lamp is triggered, the total power is suddenly passed on to the flash lamp. Only two wires are therefore required for the lamp power supply.

The flashlight units advantageously have low-voltage capacitors which match the operating voltage level of 350 V to 600 V. This results in considerable savings with respect to the dimensions and with respect to the costs for the capacitors. The fact that it is possible according to the invention to dispense with high-voltage capacitors leads to a considerable reduction in the dimensions of the flashlight housing.

In accordance with a further advantageous embodiment of the control device according to the invention, the flashlight units have SMPS (Switched Mode Power Supply) transformers which are matched to the operating voltage level of 350 V to 600 V and expediently comply with the industrial standard EN61000-3-2 (PFC: Power Factor Corrected) without bringing about additional power losses.

Since the connecting device between the flashlight units and the local master controller is in the form of a local field bus system, by which preferably up to 32 flashlight units can be connected to the local master controller, simultaneous matching of the flashlight software can be realized in the flashlight units by means of the local field bus system.

The configuration and setting of the parameters can be carried out using a PC by means of the local bus system if the local master controller can be plug-connected directly to a mobile master controller with a PC.

It is also possible to match the flashlight software on site for the local master controller and the mobile master controller.

Owing to the fact that the control device according to an embodiment of the invention dispenses with high-voltage capacitors, it is possible to provide the PCBs of the flashlight units of the control device according to the invention with a microcontroller, by which each flash lamp in the form of a low-voltage lamp can be assigned an individual address. Such a microcontroller could not be used in control devices according to the prior art which were equipped with high-voltage capacitors since its operation could be impaired by the current peaks. By use of the microcontroller in conjunction with the local field bus system, considerably improved monitoring measures for the flash lamps or the low-voltage lamps can be used.

In contrast to conventional control devices, in which it was always possible to establish whether a flash lamp was broken without being able to know which of the flash lamps of the flashlight system was broken, the microcontroller can be used in the flashlight unit to report back the address of a defective flash lamp via the local field bus system such that the location of the defective flash lamp can be detected centrally. Naturally, each flash lamp can be addressed and controlled directly.

Since only a small number of interconnections are required between several PCBs and a few additional components, the complexity of both the wiring and the device can be reduced considerably. The microcontroller makes possible active current regulation for each flash lamp or low-voltage lamp. This makes it possible to considerably increase the life of the low-voltage lamps or flash lamps, which considerably reduces the effort involved in maintaining the flashlight system.

Furthermore, the microcontroller can be used to register the operating time of the respective low-voltage lamp or flash lamp, it being possible to replace low-voltage lamps or flash lamps at regular time intervals in order to prevent failures as much as possible. The microcontroller of each PCB is expediently designed such that the luminous intensity of each flash lamp in the form of a low-voltage lamp can be controlled separately, and it should advantageously be possible to electronically regulate the control as a function of parameters determining the weather and/or light conditions. As a result of this, the influences of fluctuations in the output voltage level, the capacitor system, the line resistance, ambient temperatures etc. are minimized.

The local field bus system then makes it possible to control the luminous intensity of the individual flash lamps or low-voltage lamps separately. The luminous intensity an be controlled electronically such that different weather conditions or other requirements can be considered. For example, a higher luminous intensity can be set in the case of fog than in the case of optimal visibility.

Furthermore, the luminous intensity can be varied continuously, namely individually for each flash lamp or low-voltage lamp or else for all flash lamps or low-voltage lamps such that, for example, even in the case of 50 flash lamps or low-voltage lamps connected in series, different luminous intensities can be applied to the first, second, third etc. With the above-described local field bus system in conjunction with the microcontrollers, all possible adjustments to or regulations of the luminous intensity are therefore possible. For example, it is also possible for the luminous intensity to be set in dependence on an approaching or departing airplane.

When the airplane has gone past some of the flash lamps or low-voltage lamps, these can be switched off. Further, the luminous intensity of the flash lamps or low-voltage lamps located in the remaining field of vision of the airplane can be intensified.

If the microcontroller of each PCB is designed such that the luminous intensity of each flash lamp in the form of a low-voltage lamp can be regulated as a function of the cable length of the lamp cable between the flashlight unit and the flash lamp in the form of a low-voltage lamp, it is possible for all of the flash lamps or low-voltage lamps to nevertheless retain the same or the desired luminous intensity. This is true even when they are connected to their flashlight units using different cable lengths.

The luminous intensity or brightness of the flash lamps or low-voltage lamps can be adjusted in a stepless manner, it always being possible for there to be small deviations from the set brightness level in the case of the individual low-voltage lamps. The power consumption is matched to the brightness level and to timing requirements and is as constant as possible, the power correction factor being close to 1. It is thus possible to prevent starting current inrushes. In a manner which is advantageous with respect to safety, this results in rapid voltage discharges.

In order to reduce the complexity for the wiring in the production and installation, it is advantageous if each flashlight unit has input and output connections, by which it can be connected to the power supply line.

It is alternatively possible to connect the flashlight units to the power supply line via connecting sockets.

The local master controller can be connected to physically remote user control centers, control stations or the like via a first connecting bus, via the first and a second connecting bus, via a multi-line connecting bus or via the first connecting bus and the multi-line connecting bus. In the user control center or in the control station, the flashlight units and flash lamps or low-voltage lamps associated with a master controller can be presented as a single system. A large number of simultaneous remote monitoring operations can be realized. The flashing sequence and the frequency of the flashlight system can be configured remotely both when setting the parameters and during operation. No measures are required for individual flash lamps or low-voltage lamps.

It is possible to carry out a remote monitoring operation with respect to the detailed system status and the status of each flash lamp or low-voltage lamp. The luminous intensity of each low-voltage lamp or flash lamp can be set individually and remotely. An individual luminous intensity level can be prescribed for the flash lamps or low-voltage lamps, and when this level is undershot, a corresponding alarm signal is produced. It is possible to analyze the real-time sequence and the flashing frequency of the operating system, namely when setting the parameters and during operation. Flashing sequences can be programmed in advance, for example MALSR, ALSF, SSALR, ODALS etc.

Each flashlight unit can be given a separate housing.

In an advantageous refinement, two or more flashlight units, preferably three flashlight units, are arranged in a housing which is common to them, advantageously resulting in savings on the wiring during installation. Furthermore, when there are three flashlight units arranged in one housing, the load equilibrium of a three-phase system can be symmetrical.

The housings accommodating the flashlight units are advantageously made of plastic or the like.

As long as two or more flashlight units are accommodated in a housing which is common to them, advantageously the switching electronics of the two or more flashlight units arranged in this housing can be supplied with electrical power in a redundant manner. In order to protect against overvoltages, it is advantageous if each flashlight unit has an overvoltage protection element.

If the overvoltage is low, the overvoltage protection element can absorb the excess power. If the overvoltage is high, a failure of the overvoltage protection element is possible, and the flashlight unit would then be unprotected with respect to future overvoltages. In this case, a toggle switch on the overvoltage element is tripped, and this is detected by the PCB of the flashlight unit and then passed on to the local master controller or the user control center, the control station etc.

In order to provide one or more of reliable protection against and/or reliable monitoring of the moisture and the temperature conditions, it is expedient if each flashlight unit has an associated heating device and associated temperature sensors.

In accordance with an advantageous refinement of an embodiment of the invention, the PCB of each flashlight unit has an additional connection, by which a direct connection to a mobile master controller with a PC or a similar control unit can be installed. By this, it is possible for flashlight units which are positioned very far away, for example more than 1 km, from the local master controller and which are also arranged, for example, beyond specified safety limits, to be subjected to flashlight software matching.

The local master controller is expediently provided with a position switch having five settings, namely the setting "Remote", the setting "Off", the setting "Step 1", the setting "Step 2" and the setting "Step 3". This makes it possible for the user to control the flashlight units of the control device on a local basis. In normal operation, the position switch of the local master controller is in the position "Remote", in order to provide access to the control device via the connecting buses or the multi-line connecting bus.

BRIEF DESCRIPTION OF THE DRAWINGS

Further advantages, features and details of the invention will become evident from the description of illustrated exemplary embodiments given hereinbelow and the accompanying drawing, which is given by way of illustration only and thus is not limitative of the present invention, wherein:

The drawing shows a block diagram of a control device according to an embodiment of the invention for flashlight systems at airports.

DETAILED DESCRIPTION OF THE PREFERRED EMBODIMENTS

A control device 1 for flashlight systems at airports, as is shown in the figure, has a large number of flashlight units 2, of which in each case one has an associated flash lamp 3 in the form of a low-voltage lamp.

Each flashlight unit 2 is connected on the input side to a power supply line 4. In the exemplary embodiment shown, the flashlight unit 2 is connected to the power supply line 4. This is shown by way of a connecting socket 5. Alternatively, it is possible to provide each flashlight unit 2 with input and output connections, by which the flashlight unit 2 can then be connected directly to the power supply line 4. A connecting socket 5 is dispensed with in the latter case, which reduces the complexity for the wiring in the production and installation of the control device 1.

The flashlight unit 2 is connected to the low-voltage lamp or the flash lamp 3 on the output side via a lamp cable 6 in the form of a low-volt line.

The low-voltage lamps or flash lamps 3 operate at a voltage level between 350 V and 600 V. Correspondingly, low-voltage capacitors, which make available an operating voltage level between 350 V and 600 V for the flash lamps 3, are provided in the flashlight units 2. The lamp cables 6 are (as already mentioned above) in the form of low-volt lines for this voltage level between 350 V and 600 V. The flashlight units 2 also include SMPS (Switched Mode Power Supply) transformers which are matched to the voltage level of 350 V to 600 V and comply with the industrial standard EN61000-3-2 (PFC: Power Factor Corrected).

Furthermore, a microcontroller is provided in a PCB (Printed Circuit Board) of the flashlight units 2. Microcontrollers of this type can be combined in the case of the control device 1 according to an embodiment of the invention with the PCB of the flashlight units 2 since high-voltage capacitors are no longer used (as in the case of the prior art) in the design of the flashlight units 2, with the result that current peaks impairing the operation of microcontrollers no longer occur in the case of the flashlight unit 2 of the control device 1 according to the invention. By use of the PCB of the flashlight unit 2 which is provided with the microcontroller, the low-voltage lamps or flash lamps 3 of the flashlight system can be supplied with electrical power in a regulated manner.

By use of the microcontroller provided in each flashlight unit 2, each low-voltage lamp or flash lamp 3 can be assigned an individual address. Furthermore, each low-voltage lamp or flash lamp 3 can be controlled separately, it being possible for the operation of the low-voltage lamp or flash lamp 3 to be regulated electronically as a function of parameters determining the weather and/or light conditions by use of the PCB of the flashlight unit 2 which is equipped with the microcontroller. The microcontroller or the PCB also makes it possible to take into account the cable length between the flashlight unit 2 and the flash lamp 3 when controlling the low-voltage lamp or the flash lamp.

The flashlight units 2 of the control device 1 according to an embodiment of the invention and shown in the figure are connected to a local master controller 8 via a local field bus system 7, it being possible in the exemplary embodiment shown of the control device according to the invention for a local master controller 8 to be connected to up to 32 flashlight units 2.

A mobile master controller 9, which has an associated PC 10, can be connected to the local master controller 8 and to each flashlight unit 2 by means of a plug connection. This makes it possible to configure and set the parameters for the control device 1 using the PC 10 by means of the local field bus system 7 or directly using each flashlight unit 2.

The local master controller 8 can be connected to user control centers, control stations etc. (not shown in the FIGURE) via a first connecting bus 11, via the first connecting bus 11 and a second connecting bus 12, via the first connecting bus 11 and a multi-line connecting bus 13 or only via the multi-line connecting bus 13.

In the exemplary embodiment shown, each flashlight unit 2 is provided separately on its own in a housing, which can be in the form of a plastic housing. It is possible to provide, for example, three flashlight units 2 in a housing which is common to them, in this case the switching electronics of the three flashlight units 2 provided in one housing being supplied with electrical power in a redundant manner.

Each flashlight unit 2 is equipped with an overvoltage protection element and with a heating device and temperature sensors. A low overvoltage can be absorbed by the overvoltage protection element. If the overvoltage is high, however, a failure of the overvoltage protection element is possible, and the flashlight unit 2 would then be unprotected with respect to future overvoltages. In this case, a toggle switch on the overvoltage protection element is tripped, and this is detected by means of the PCB of the flashlight unit 2 and then passed on to the local master controller 8 or the user control center, the control station etc.

Exemplary embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A control device for a flashlight system at an airport, comprising;
    flashlight units, connected on an input side to a power supply line and each respectively connected on an output side to a respective flash lamp of the flashlight system via a lamp cable, each of the flashlight units including;
    a printed circuit board (PCB), including a circuit to control the respective flash lamp and a power-integrating low-voltage capacitor;
    a local master controller; and
    a field bus system, by which the local master controller is connected to the flashlight units, wherein the
    power-integrating low-voltage capacitors are, supplied with power by a power factor-corrected power source connected to the flash lamps, wherein the power transferred to the flash lamps is electronically controlled to regulate luminous intensity and to stabilize the luminous intensity with respect to voltage-source and line-impedance fluctuations, and wherein at least one of simultaneous and mixed flashlight configuration patterns is realized.

2. The control device as claimed in claim 1, wherein the low-volatage capacitors of the flashlight units are matched to an operating voltage level of 350 V to 600 V.

3. The control device as claimed in claim 2, wherein the flashlight units include Switched Mode Power Supply (SMPS) transformers which are matched to the operating voltage level of 350 V to 600 V.

4. The control device as claimed in claim 1, wherein the flashlight units include Switched Mode Power Supply (SMPS) transformers which are matched to an operating voltage level of 350 V to 600 V.

5. The control device as claimed in claim 1, wherein the local master controller is connectable to up to 32 flashlight units via of the local field bus system.

6. The control device as claimed in claim 1, wherein the local master controller is plug-connectable directly to a mobile master controller-with at least one of a PC and a control unit.

7. The control device as claimed in claim 1, wherein the PCBs of the flashlight units each are provided with a microcontroller, by which each flash lamp in the form of a low-voltage lamp is assigned an individual address.

8. The control device as claimed in claim 7, wherein the microcontroller of each PCB is designed such that the luminous intensity of each flash lamp, in the form of a low-voltage lamp, is separately controllable.

9. The control device as claimed in claim 8, wherein the microcontroller of each PCB is designed such that the luminous intensity of each flash lamp, in the form of a low-voltage lamp, is electronically regulated as a function of parameters determining at least one of the weather and light conditions.

10. The control device as claimed in claim 7, wherein the microcontroller of each PCB is designed such that the luminous intensity of each flash lamp, in form of a low-voltage lamp, is electronically regulated as a function of parameters determining at least one of the weather and light conditions.

11. The control device as claimed in claim 7, wherein the microcontroller of each PCB is designed such that the luminous intensity of each flash lamp, in a form of a low-voltage lamp, is regulated as a function of the cable length of the lamp cable between the flashlight unit and flash lamp.

12. The control device as claimed in claim 1, wherein each flashlight unit includes input and output connections, for connection to the power supply line.

13. The control device as claimed in claim 1, wherein the flashlight units are connected to the power supply line via connecting sockets.

14. The control device as claimed in claim 1, wherein the local master controller is connectable to a user control center via a first connecting bus.

15. The control device as claimed in claim 14, wherein the local master controller is connectable to a user control center via the first and a second connecting bus.

16. The control device as claimed in claim 14, wherein the local master controller is connectable to a user control center via the first connecting bus and a multi-line connecting bus.

17. The control device as claimed in claim 1, wherein the local master controller is connectable to a user control center via a multi-line connecting bus.

18. The control device as claimed in claim 1, wherein each flashlight unit includes a housing.

19. The control device as claimed in claim 18, wherein the housings accommodating the flashlight units are in a form of plastic housings.

20. The control device as claimed in claim 1, wherein at least two flashlight units are arranged in one housing.

21. The control device as claimed in claim 20, wherein switching electronics of the at least two flashlight units arranged in one housing are supplied with electrical power in a redundant manner.

22. The control device as claimed in claim 20, wherein the housings accommodating the flashlight units are in a form of plastic housings.

23. The control device as claimed in claim 1, wherein each flashlight unit further includes an overvoltage protection element.

24. The control device as claimed in claim 1, wherein each flashlight unit further includes an associated heating device and associated temperature sensors.

25. The control device as claimed in claim 1, wherein the PCB of each flashlight unit includes an additional connection, by which a direct connection to a mobile master controller with at least one of a PC and a control unit is installed.

26. The control device as claimed in claim 1, wherein at least three flashlight units are arranged in one housing.

27. The control device as claimed in claim 26, wherein switching electronics of the at least three flashlight units arranged in one housing are supplied with electrical power in a redundant manner.

* * * * *